(12) United States Patent  
Belford

(10) Patent No.: US 7,270,280 B2  
(45) Date of Patent: Sep. 18, 2007

(54) DISC SHAPE DRIPPER

(75) Inventor: James Wallace Belford, Mobile Post Hefer (IL)

(73) Assignee: Netafim Ltd., Tel Aviv (IL)

( * ) Notice: Subject to any disclaimer, the term of this patent is extended or adjusted under 35 U.S.C. 154(b) by 179 days.

(21) Appl. No.: 10/871,529

(22) Filed: Jun. 21, 2004

(65) Prior Publication Data

US 2005/0279866 A1 Dec. 22, 2005

(51) Int. Cl.
*B05B 15/00* (2006.01)
*F16L 55/027* (2006.01)

(52) U.S. Cl. ........................... 239/542; 138/42
(58) Field of Classification Search ............... 239/542, 239/553, 553.5, 547, 533.1, 548, 596; 138/42
See application file for complete search history.

(56) References Cited

U.S. PATENT DOCUMENTS 4,060,200 A * 11/1977 Mehoudar .................. 239/542
5,203,503 A 4/1993 Cohen
5,271,786 A 12/1993 Gorney et al.
6,039,270 A 3/2000 Dermitzakis
6,213,408 B1 * 4/2001 Shekalim ..................... 239/1
2002/0104903 A1 * 8/2002 Eckstein et al. ............. 239/542

FOREIGN PATENT DOCUMENTS

IL PCT/IL97/00298 3/1998
IL PCT/IL02/00953 6/2003

* cited by examiner

*Primary Examiner*—Darren Gorman
(74) *Attorney, Agent, or Firm*—The Nath Law Group; Jerald L. Meyer; Matthew J. Moffa

(57) ABSTRACT

An integral in-line dripper to be used bonded to the internal surface of an irrigation pipe. The dripper has an inlet facing the inside of the pipe and an outlet connected to an exit opening in the pipe wall. The dripper has a flattened shape defined between a first surface with an open meandering channel formed therein, the channel's inlet being connected to the dripper's inlet, and a second surface opposite the first surface. The topography of the first surface is so designed that the dripper can be bonded to the internal surface of the pipe in any orientation about a radius of the pipe passing through the first and the second surface, so as to form a flow-restriction labyrinth connected to the outlet of the dripper.

16 Claims, 3 Drawing Sheets

US 7,270,280 B2

DISC SHAPE DRIPPER

FIELD OF THE INVENTION

This invention relates to irrigation drippers, and more particularly to drippers fitted integrally in irrigation pipes and to methods for production of such pipes.

BACKGROUND OF THE INVENTION

U.S. Pat. No. 6,039,270 describes an irrigation pipe with internally attached emitters. The emitters are placed in the interior of the pipe at its production phase and are sunken almost totally in the wall of the pipe which is swollen at the location of the emitters. The swellings allow to preserve the internal cross-sectional area of the pipe and thus to avoid excessive hydraulic losses and to reduce the required working pressure for irrigation per unit length of the pipe. The emitters disclosed in U.S. Pat. No. 6,039,270 are round in their plan view or are elongated along the pipe axis.

SUMMARY OF THE INVENTION

In accordance with the present invention, there is provided an integral in-line dripper for use bonded to the internal surface of an irrigation pipe. The dripper has an inlet facing the inside of the pipe and an outlet in fluid communication with an exit opening in the pipe wall. The dripper has a flattened shape defined between a first surface with an open meandering channel formed therein, the channel's inlet being in fluid communication with the dripper's inlet, and a second surface opposite the first surface. The topography of the first surface of the dripper is so designed that the dripper can be bonded to the internal surface of the pipe in any orientation about a radius of the pipe passing through the first and the second surface. At that, the topography allows the internal surface of the pipe to be bonded tightly to the first surface of the dripper especially in the areas adjacent the meandering channel so as to form a flow-restriction labyrinth with an outlet constituting or being in fluid communication with the outlet of the dripper.

According to one aspect of the present invention, the dripper has a means for aligning thereof before the bonding so that its first surface faces the internal surface of the pipe. Preferably, the first and the second surface have different shapes, such that the difference may be used as a means for alignment.

In one embodiment of the dripper, the means for alignment is formed as a step, e.g. circular, protruding from the second surface. The circular step may be an annular wall or a cylinder pin, preferably coaxial with an axis of symmetry of the second surface. A cylinder pin protruding from the first surface may be used as well.

In another embodiment, the second surface is more convex than the first surface, e.g. dome-shaped, while the first surface is only slightly convex or substantially flat and this difference is used for alignment.

Preferably, the dripper's inlet is a filtering inlet comprising multiple openings in fluid communication with the inlet of the meandering channel. The openings may be disposed on the second surface or on a peripheral surface connecting the first and second surfaces. For example, the filtering inlet may be formed as multiple radial passages on the first surface, starting with the multiple openings and complemented by the internal surface of the pipe.

The first surface of the dripper may be, for example, flat, dome-shaped, or part of a cylindrical surface. Preferably, the first surface is substantially isometric in plan view, for example it may have a generally circular symmetry, or be just circular in shape. However, the dripper may be also elongated if its size and the topography of the first surface allow bonding in arbitrary orientation about the local pipe's radius.

In accordance with a second aspect of the present invention, the topography of the second surface is similar to the topography of the first surface, including a second open meandering channel, such that the dripper can be bonded to the pipe with either of the first and second surfaces, in any orientation with respect to a radius of the pipe passing through the first and the second surface.

Preferably, the dripper has a filtering inlet comprising multiple openings as described above, formed as multiple radial passages on both the first and the second surface so as to be complemented by the internal surface of the pipe after bonding.

The dripper may be formed with the second surface as a mirror image of the first surface. Alternatively, the second surface may be identical to the first surface and disposed so that recesses on the second surface are matching protrusions on the first surface and vice-versa.

In accordance with a third aspect of the present invention, there is provided an irrigation pipe with integral in-line drippers of flattened shape bonded to the internal surface of the pipe with a first surface of the drippers. The first surface has an open meandering channel formed therein and closed tightly by the internal surface. The flattened shape is substantially isometric in plan view, or is elongated but at least some of the drippers are bonded with their longer dimension non-parallel to the axis of the pipe.

The drippers of the present invention allow mass production in simple molds or dies. Even more important, as the specially designed form allows bonding in arbitrary orientation, the drippers may be fed to the bonding position with little or no alignment and thus achieve high rate of pipe production.

BRIEF DESCRIPTION OF THE DRAWINGS

In order to understand the invention and to see how it may be carried out in practice, some embodiments will now be described, by way of non-limiting example only, with reference to the accompanying drawings, in which.

DETAILED DESCRIPTION OF THE INVENTION

Figure 1:
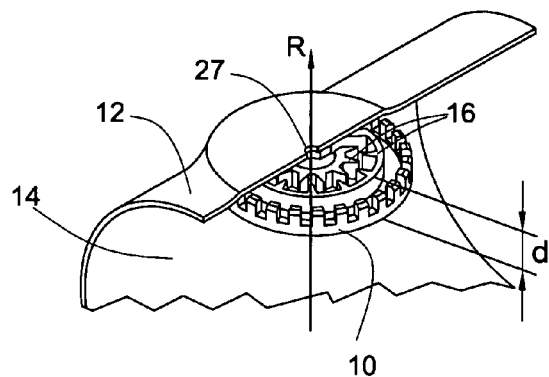
FIG. 1 is a perspective sectional view of a dripper bonded into an irrigation pipe in accordance with the present invention

With reference to FIG. 1, there is shown an integral in-line dripper 10 according to the invention, bonded during the extrusion process to an extruded irrigation pipe 12, at the internal surface 14 of the pipe.

Figures 2A, 2B:
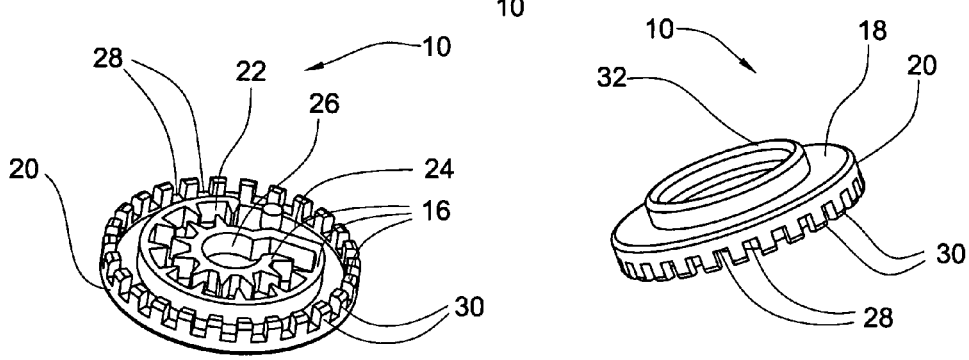
FIGS. 2A and 2B are perspective top and bottom views of a dripper with an aligning ring.

With further reference to FIGS. 2A and 2B, the dripper 10 has a top surface 16 designed for bonding to the internal surface 14 of the pipe 12, and a bottom surface 18 facing the inside of the pipe. The top surface 16 and the bottom surface 18 are connected by a peripheral surface 20. It will be appreciated that the terms "top" and "bottom" are purely conventional and pertain only to the orientation shown in FIG. 1.

The dripper 10 further has a meandering channel 22 carved in the top surface 16 of the dripper. The channel 22 has an inlet 24 and an outlet 26. When the dripper is bonded in the pipe, the meandering channel 22 is covered by the internal surface 14 of the pipe to form a labyrinth, and an outlet 27 is formed in the pipe wall, aligned with the outlet 26 of the labyrinth. It will be appreciated that the top surface 16 must allow tight bonding of the pipe wall adjacent the meandering channel 22, so as to ensure that the labyrinth has closed cross-section.

The dripper 10 further has a plurality of openings 28 in the peripheral surface 20, formed as radial passages between ribs 30, in fluid communication with the inlet 24 of the channel 22. When the dripper 10 is bonded to the pipe wall and the passages are covered by the internal surface of the pipe, these openings constitute a distributed filtering inlet.

Figure 3:
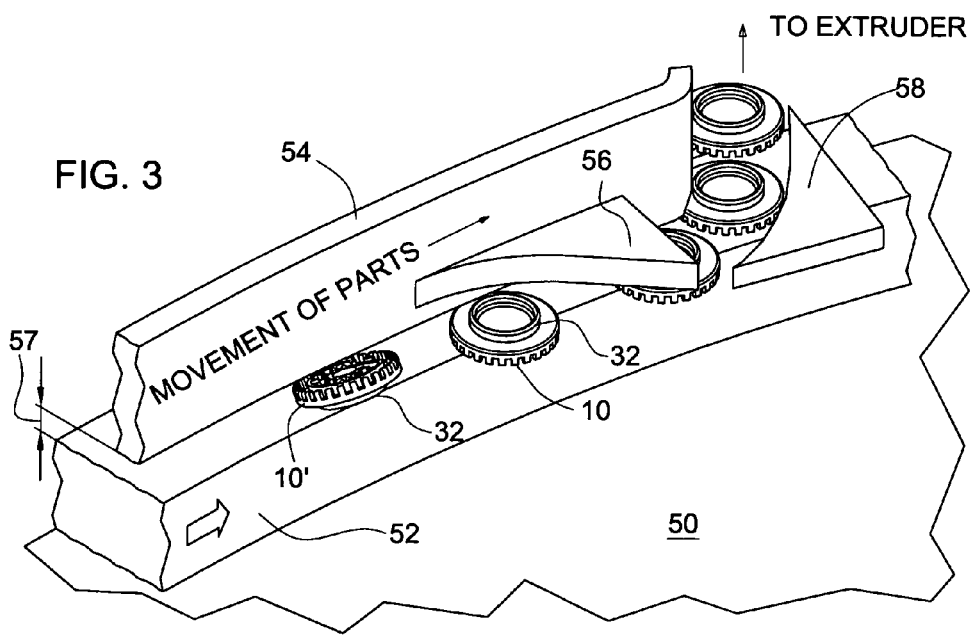
FIG. 3 shows the process of dripper alignment in the feeder of an extrusion installation, using an aligning ring.

The dripper 10 has an annular wall (ring) 32 protruding from the bottom surface 18, which is used as a means for alignment. With reference to FIG. 3, the drippers 10 come to a feeder 50 in arbitrary orientation. A rotary ring 52 drags the drippers, by frictional force, along a qualifying ring 54 towards a rejection cam 56. Between the qualifying ring 54 and the rotary ring 52 there is a gap 57 adapted to accommodate the thickness of the dripper but not the ring 32. As a result, drippers oriented with the ring 32 upwards pass under the rejection cam 56 and proceed past a guiding rail 58 towards the extruder. Drippers with different orientation, as denoted by 10', are rejected back into the feeder. Alternatively, in a vibratory bowl system, the vibratory force will move the drippers along the ring 52 and against the ring 54 which will be stationary relative to each other. The rejection cam 56 will operate in the same manner as above.

The dripper 10, as well as all other drippers described below have more or less flattened shape such that their smallest dimension "d" is perpendicular to the pipe internal surface when bonded thereto. Their plan form, i.e. the projection along that smallest dimension, or the contour when viewed from the bottom or the top surface, is circular, with diameter not exceeding the diameter of the pipe, assuming a circular pipe cross-section. However, the plan form may be just with approximately equal dimensions in all directions (isometric) or with circular symmetry. Even an elongated plan form may be used, if its longer dimension is about the pipe diameter or less. The dripper plan form and the top surface topography are designed to allow bonding of the dripper to the pipe wall in any orientation about a pipe radius R passing through the center of the top surface.

The dripper 10 and some other drippers described below have a means for alignment of the dripper during pipe manufacture to ensure that its top surface faces the internal surface of the pipe before bonding. If the dripper has an axis of symmetry, the alignment means is preferably coaxial with that axis.

Figure 4:
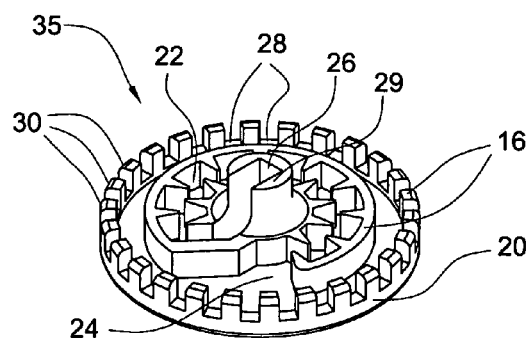
FIG. 4 is a top perspective view of a dripper with dripper outlet formed as an aligning pin.

FIG. 4 shows a dripper 35, similar to the dripper 10 except that its alignment means is in the form of cylindrical pin 29 at the top surface 16. The pin is combined with the dripper outlet 26 on the top surface 16.

Figure 5A:
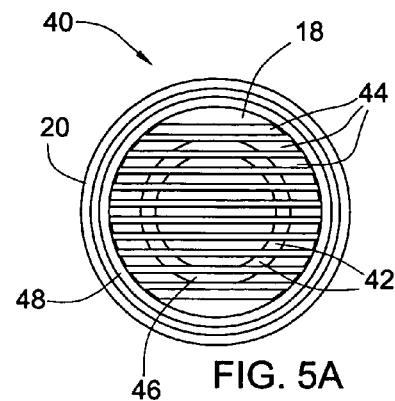
FIG. 5A is a bottom view of a dripper with an aligning step.
Figure 5B:
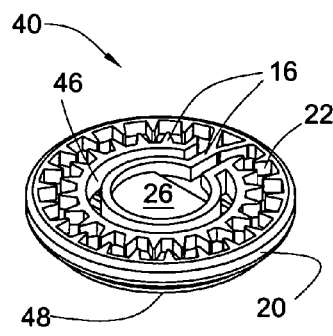
FIG. 5B is a top perspective view of the dripper in FIG. 5A.

FIGS. 5A and 5B show a dripper 40 where the filtering inlet is disposed on the bottom surface 18. A plurality of openings 42 are formed at crossings of parallel channels 44 made on the bottom surface 18, with an annular channel 46 made on the top surface beside the meandering channel. In this case, a circular step 48 at the bottom surface 18 is used as a means for alignment.

Figure 6A:
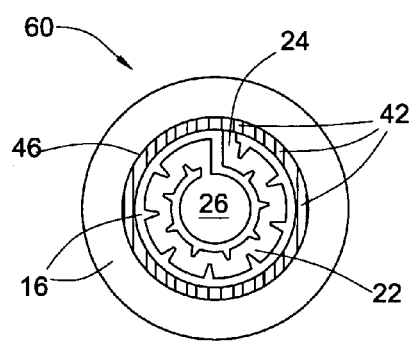
FIG. 6A is a top view of a dripper with aligning asymmetry.
Figure 6B:
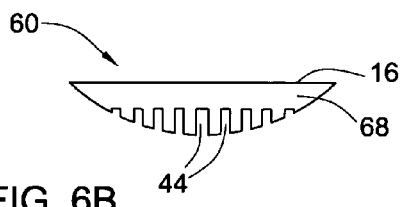
FIG. 6B is a side view of the dripper in FIG. 6A.

FIGS. 6A and 6B show a dripper 60, similar to the dripper 40, with the filtering inlet disposed on the bottom surface 68. Similar elements of the dripper 60 have the same numbers as the elements of the dripper 40. In this case, the bottom surface 68 is dome-shaped, which though having no step can still be used as a means for alignment.

Figure 7:
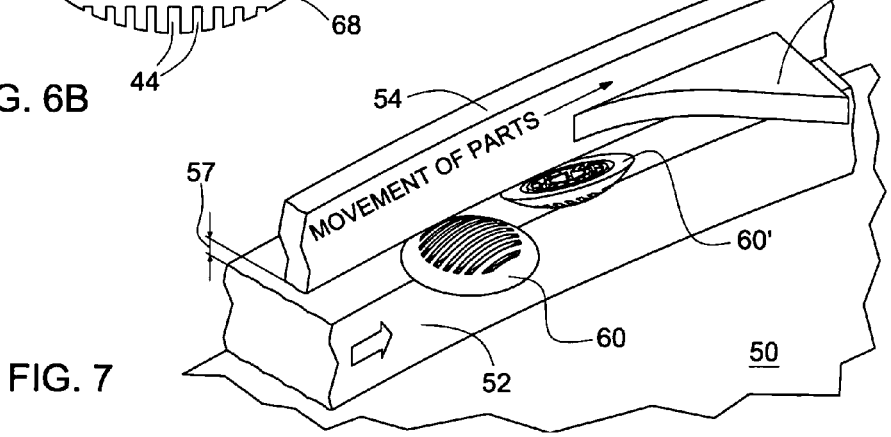
FIG. 7 shows the process of dripper alignment in the feeder of an extrusion installation using aligning asymmetry.

The process of alignment of the dripper 60 is shown in FIG. 7. The feeder 50 is essentially the same as that shown in FIG. 3, with a rotary ring 52, a qualifying ring 54, and a rejection cam 56. Between the qualifying ring 54 and the rotary ring 52 there is a gap 57 adapted to accommodate the thin edge of the dripper 60. The drippers oriented with the dome-shaped surface 68 upwards pass under the rejection cam 56, while drippers with opposite orientation, as denoted by 60', are rejected back into the feeder.

It will be appreciated that any difference of shape between the top and the bottom surface of the dripper may be used for selection of properly aligned drippers in the feeder.

Figure 8:
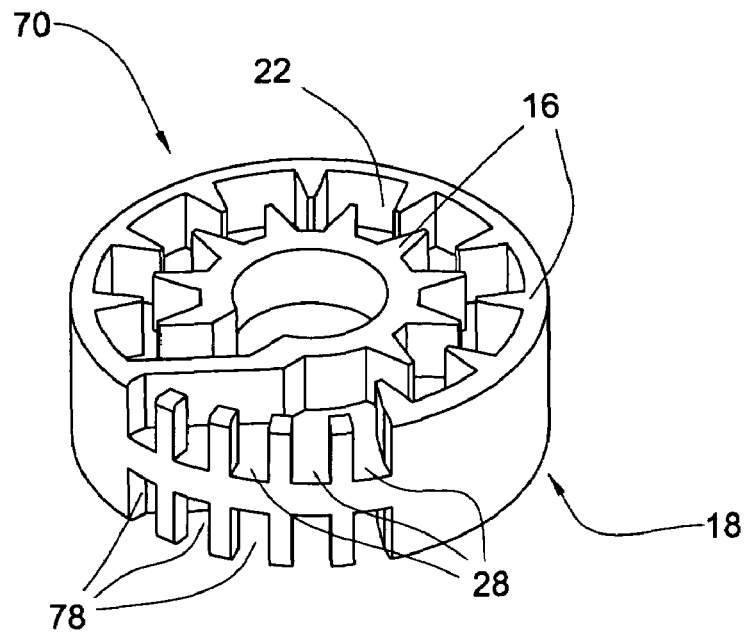
FIG. 8 is a perspective view of a dripper with mirror symmetry allowing arbitrary bonding in the irrigation pipe of either labyrinthed face.

Drippers according to the present invention may have no means and no need to be aligned before bonding to ensure that their top surface faces the pipe wall. With reference to FIG. 8, there is shown an integral in-line "double-faced" dripper 70 for irrigation pipe, where each of the top surface 16 and the bottom surface 18 is adapted for bonding to the internal surface of the pipe. The dripper 70 has two meandering channels 22 and 72, at the top and at the bottom surfaces, and two filtering inlets with openings 28 and 78 respectively. Owing to the flattened shape of the dripper, during the pipe manufacturing process, the dripper will always assume a position where one of its top and bottom surfaces faces the pipe wall, without special aligning means. Such dripper can be bonded to the pipe surface with either of the top and the bottom surfaces. In the example shown in FIG. 8, the dripper is made with the bottom surface as mirror image of the top surface.

Figures 9A, 9B:
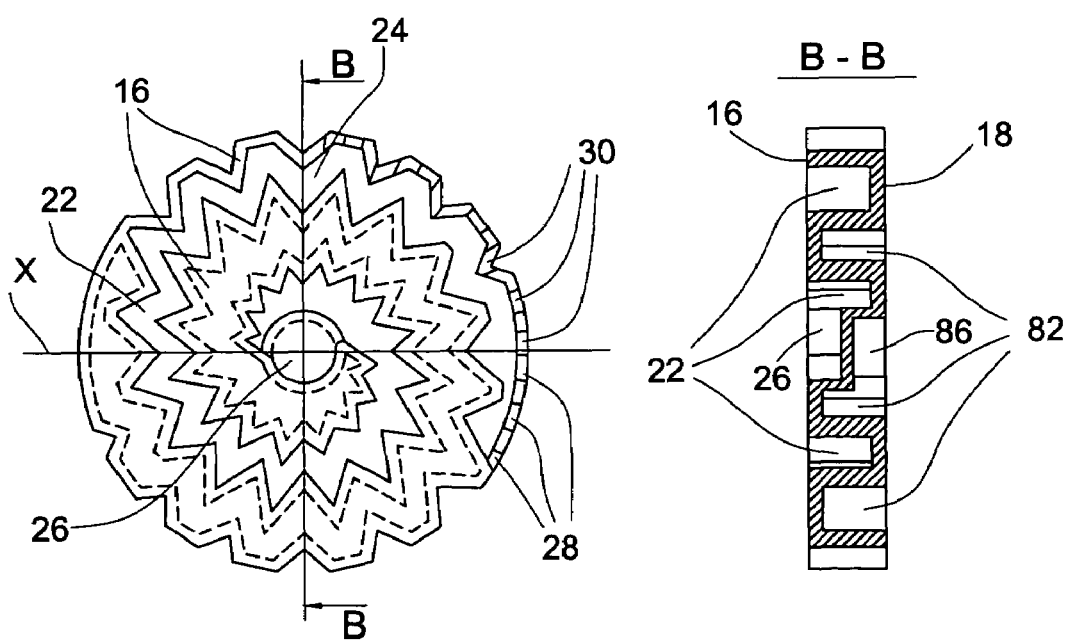
FIG. 9A is a top view of another dripper, with circular symmetry, allowing arbitrary bonding in the irrigation pipe.
FIG. 9B is a cross-sectional view of the dripper in FIG. 9A.

In FIGS. 9A and 9B, there is shown another integral in-line double-faced dripper 80 where both the top surface 16 and the bottom surface 18 are adapted for bonding to the internal surface 14 of the pipe. Here the whole top surface 16 including the meandering channel 22 and the outlet 26 is identical to the bottom surface but is so designed and disposed that recesses on the bottom surface match protrusions on the top surface and vice-versa. In fact, the topography of the bottom surface may be obtained by rotation of the top surface about the axis X.

The topography of the top surface (the surface which must be bonded to the pipe) may be flat, convex (dome-shaped), etc. Indeed there is no need that the top surface exactly matches the inner cylindrical surface of an extruded pipe. But the design has to be such that, in the moment of bonding, when the extruded pipe is soft and flexible, it can accommodate the top surface at any orientation thereof.

In all the above embodiments, the plan form of the dripper is circular but it may have any shape with circular symmetry or with approximately equal length and width (isometric). As mentioned above, however, the largest dimension of the plan form is critical, so even an elongated shape may be used if it can be accommodated transversely to the pipe axis. The circular shape has the advantage to roll smoothly in the feeder and to allow faster alignment along the path to the extruder. The topography of the top surface, the plan form of the dripper and the layout of the filtering inlet, the meandering channel and the outlet should allow the dripper to be tightly bonded to the pipe wall in any orientation with respect to the pipe axis.

Though all the explanations have been presented with respect to dippers designed for bonding in an extruded pipe, such drippers may be used with pipes manufactured by any known technology.

Although a description of specific embodiments has been presented, it is contemplated that various changes could be made without deviating from the scope of the present invention. For example, means for alignment of the dripper before feeding to the extruded pipe may be such difference of shape as different roughness of the top and the bottom surface.

The invention claimed is:

1. An integral in-line dripper of flattened shape, bonded during an extrusion process to the internal surface of an irrigation pipe, said dripper having an inlet facing the inside of the pipe and an outlet in fluid communication with an outlet opening in the pipe wall, a first surface with an open meandering channel formed therein, the channel's inlet being in fluid communication with the dripper's inlet, and a second surface opposite said first surface, wherein the topography of said first surface of the dripper is so designed that said dripper is bonded during said extrusion process to said internal surface in any orientation about a radius of the pipe passing through said first and said second surfaces, with said internal surface closing tightly said meandering channel to form a flow-restriction labyrinth with an outlet constituting or being in fluid communication with said outlet of the dripper, wherein said dripper's inlet is a filtering inlet comprising multiple openings disposed on said second surface or on a peripheral surface connecting said first and second surfaces.

2. The dripper of claim 1, further having a means for aligning thereof before bonding so that said first surface faces said internal surface of the pipe.

3. The dripper of claim 2, wherein said first surface and said second surface have different shapes such that the difference of shape can be used as said aligning means.

4. The dripper of claim 3, wherein said aligning means is a step protruding from said second surface.

5. The dripper of claim 4, wherein said first and said second surfaces have generally circular symmetry in plan view and said step is circular and coaxial with the axis of symmetry.

6. The dripper of claim 5, wherein said circular step is an annular wall.

7. The dripper of claim 3, wherein said aligning means is a cylinder pin protruding from said first or said second surface.

8. The dripper of claim 3, wherein one of said first and second surfaces is more convex than the other surface.

9. The dripper of claim 1, wherein said filtering inlet is formed as multiple radial passages on said peripheral surface, complemented by said internal surface of the pipe and starting in said multiple openings.

10. The dripper of claim 1, wherein said first surface is flat.

11. The dripper of claim 1, wherein said first surface is substantially isometric in plan view.

12. The dripper of claim 11, wherein said first surface has generally circular symmetry in plan view.

13. The dripper of claim 12, wherein said first surface is circular in plan view.

14. The dripper of claim 1, wherein said second surface has a second meandering channel and a topography designed similar to that of said first surface so that said dripper can be bonded to said internal surface of the pipe with either of said first or second surfaces, in any orientation about a radius of the pipe passing through said first and said second surface, with said internal surface closing tightly the respective meandering channel to form said flow-restriction labyrinth.

15. The dripper of claim 14, wherein said second surface is substantially a mirror image of said first surface.

16. The dripper of claim 14, wherein said second surface is substantially identical to said first surface and is disposed so that recesses on said second surface are matching protrusions on said first surface and vice-versa.

* * * * *